(12) United States Patent
Dudar

(10) Patent No.: US 12,518,576 B2
(45) Date of Patent: Jan. 6, 2026

(54) SYSTEMS AND METHODS FOR REDUCING SADDLE FUEL TANK DEPRESSURIZATION TIME

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 18/474,501

(22) Filed: Sep. 26, 2023

(65) Prior Publication Data

US 2025/0104489 A1    Mar. 27, 2025

(51) Int. Cl.
*G07C 5/08* (2006.01)
*B60K 15/035* (2006.01)
*B60K 15/03* (2006.01)

(52) U.S. Cl.
CPC .......... *G07C 5/0808* (2013.01); *B60K 15/035* (2013.01); *B60K 2015/03144* (2013.01); *B60K 2015/03256* (2013.01); *B60K 2015/03576* (2013.01)

(58) Field of Classification Search
CPC ............... G07C 5/0808; B60K 15/035; B60K 2015/03144; B60K 2015/03256; B60K 2015/03576; B60K 2015/03514; B60K 15/03519
See application file for complete search history.

(56) References Cited

U.S. PATENT DOCUMENTS

| | | | |
|---|---|---|---|
| 7,107,971 B2 | 9/2006 | Spink et al. | |
| 7,963,150 B2 | 6/2011 | Haag | |
| 9,086,040 B2 | 7/2015 | Jentz et al. | |
| 9,829,370 B2 | 11/2017 | Dudar et al. | |
| 10,906,798 B2 | 2/2021 | Dudar | |
| 2015/0142293 A1* | 5/2015 | Dudar | F02M 25/0836 701/101 |
| 2020/0290861 A1* | 9/2020 | Dudar | B60K 15/03519 |

* cited by examiner

*Primary Examiner* — Michael V Kerrigan
(74) *Attorney, Agent, or Firm* — Vincent Mastrogiacomo; McCoy Russell LLP

(57) ABSTRACT

Methods and systems are provided for diagnosing valves of a fuel system. In one example, the fuel system is configured to reduce a depressurization time of one or more fuel tanks arranged therein. A method for diagnosing the valves includes monitoring a number of pre-mature shut-off events during a refueling event to determine if the valves are degraded.

18 Claims, 7 Drawing Sheets

SYSTEMS AND METHODS FOR REDUCING SADDLE FUEL TANK DEPRESSURIZATION TIME

FIELD

The present description relates generally to methods and systems for reducing a time frame in which a saddle fuel tank is depressurized to enable commencement of a refueling event.

BACKGROUND/SUMMARY

Vehicle systems may be equipped with a fuel system including a bifurcated fuel tank for storing and delivering fuel to an internal combustion engine. For example, a fuel tank may include a reserve tank, or the fuel tank may be configured as a saddle tank in order to achieve compact packaging without compromising fuel storage. For example, saddle tanks may be utilized in all wheel drive (AWD) vehicles in which the AWD hardware occupies significant underbody space that is required for packaging a single tank. Further, saddle tanks may be designed to hold more fuel than standard fuel tanks, making them more desirable in vehicle systems that require more fuel storage, such as AWD vehicles.

Bifurcated or otherwise divided fuel tanks may have two or more compartments, including a first, "active" compartment and a second "passive" compartment, that are fluidly coupled. A fuel pump may be directly coupled to the active compartment (and not the passive compartment), the active compartment maintained with fuel via a jet pump that draws fuel from the second compartment to replenish the fuel withdrawn by the fuel pump.

For certain hybrid electric vehicles (HEVs) including but not limited to plug-in hybrid electric vehicles (PHEVs), such saddle fuel tanks may comprise sealed tanks. Specifically, such tanks may be sealed via a fuel tank isolation valve, and may be made of steel to withstand pressures and vacuum builds resulting from diurnal temperature cycles. Vehicles with sealed fuel tanks may further include fuel doors that are locked, so as to prevent the fuel door from being opened to allow refueling when the fuel tank is under pressure. Accordingly, for such tanks, in response to a request for refueling, the fuel tank isolation valve is commanded open and a fuel tank pressure transducer is relied upon for inferring whether fuel tank pressure is below a threshold, at which point the fuel door may be unlocked.

However, certain conditions including but not limited to high ambient temperatures, aggressive driving, significant fuel slosh events, variable levels of loading of a fuel vapor storage canister coupled to the fuel tank, etc., may result in fuel tank depressurization routines that take longer than desired which may lead to customer dissatisfaction. Such issues may be exacerbated for vehicles that include a saddle fuel tank. Specifically, the main factors associated with fuel tank depressurization comprise a size of the vapor space and pressure magnitude. The larger the vapor space, the more time it may take for pressure to reach atmospheric pressure once vented. In a case where one tank of the saddle tank is empty, the empty tank becomes a vapor reservoir which may thus contribute to longer than desired depressurization times in response to requests to refuel.

Some methods may include depressurizing the primary side to the secondary side and may include commanding open a first refueling valve included in a conduit that couples the primary side to the secondary side. Such a method may further comprise selectively coupling the secondary side to a fuel vapor storage canister via a second refueling valve, where the request for refueling may further comprise maintaining the second refueling valve in an open configuration during depressurizing the primary side to the secondary side.

While these routines may reduce depressurization times, vehicle manufacturers include diagnostic routines for components included in a powertrain. Thus, robust methods and systems for accurately determining a condition of the first refueling valve and the second refueling valve may be desired.

In one example, the issues described above may be at least partially solved by a method for diagnosing a valve arranged in a conduit fluidly coupling a primary fuel tank and a secondary fuel tank during a refueling event or following the refueling event. In this way, the valve may be diagnosed without altering engine operating parameters.

The above advantages, and other advantages and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for reducing fuel tank depressurization times in response to a request via a vehicle operator to initiate a refueling event. The systems and methods pertain particularly to AWD hybrid electric vehicles with limited engine run-time, such as the hybrid vehicle depicted at FIG. 1. The reduction in fuel tank depressurization times of the present disclosure relate to systems and methods for saddle fuel tanks, such as the saddle fuel tank depicted at FIG. 2. Specifically, by incorporating a first refueling valve for sealing a primary side and a secondary side of the saddle fuel tank, as well as extending a load conduit that includes a second refueling valve from the secondary fuel tank, the load conduit fluidically coupling the secondary fuel tank to a fuel vapor storage canister, methodology discussed herein may be used to prevent the secondary fuel tank from acting as a vapor holding tank, which may thus change rates of depressurization of the saddle fuel tank such as that depicted at FIG. 2. Diagnostics for determining a first condition or a second condition of the first refueling valve (RV1) and/or the second refueling valve (RV2) are shown in FIGS. 3-6. FIG. 7 shows a graphical illustration of the method of FIG. 5.

Figure 1:
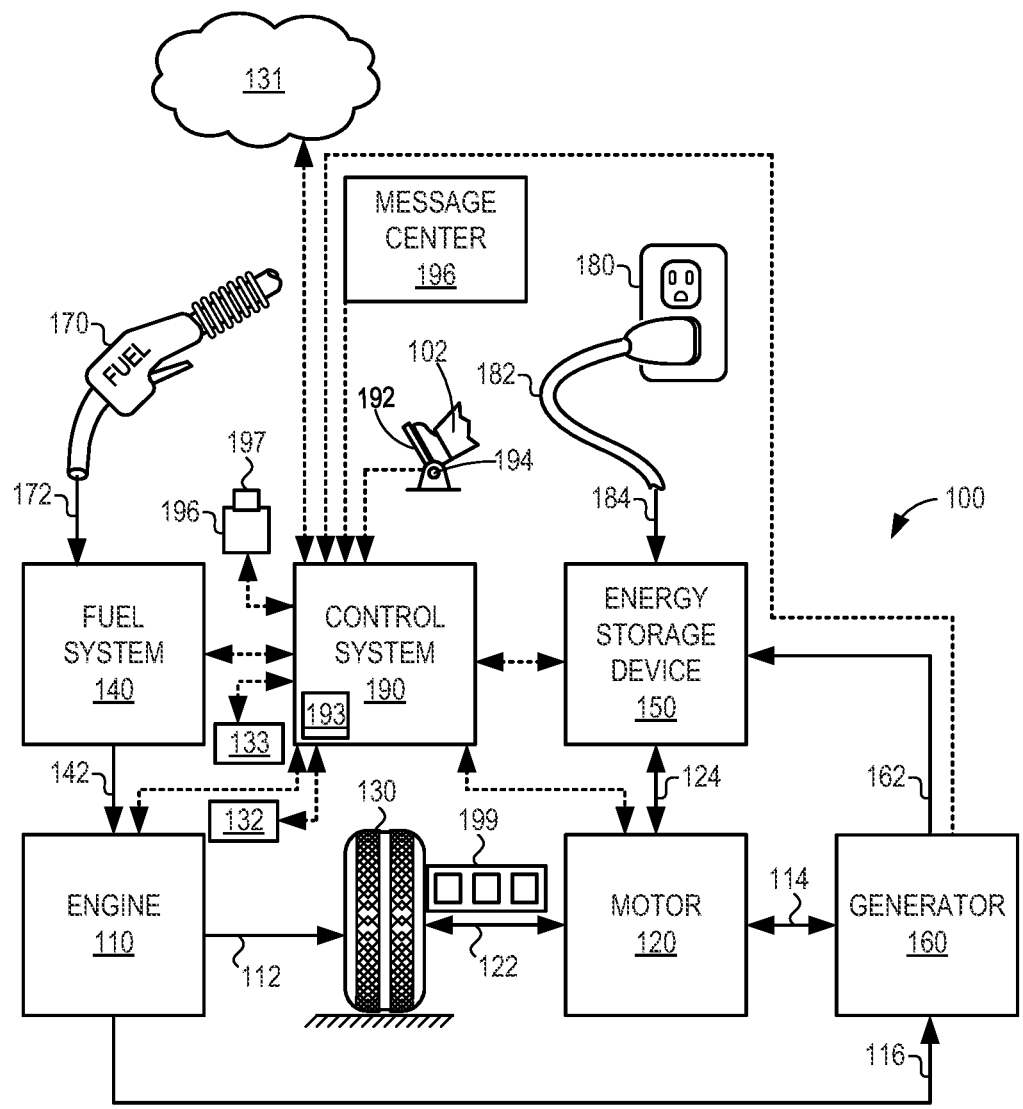
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative energy recovery operation of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks (see FIG. 2) for storing fuel on-board the vehicle. For example, the one or more fuel storage tanks may store one or more liquid fuels, including but not limited to: gasoline, diesel, and alcohol fuels. In some examples, the fuel may be stored on-board the vehicle as a blend of two or more different fuels. For example, fuel system may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a foot pedal to increase or decrease powertrain output.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel system 140 may be configured to store the fuel received from fuel dispensing device 170 until it is supplied to engine 110 for combustion. In some examples, control system 190 may receive an indication of the level of fuel stored at fuel system 140 via a fuel level sensor. The level of fuel stored at fuel system 140 (e.g., as identified by the fuel level sensor) may be communicated to the vehicle operator, for example, via a fuel gauge or indication in a vehicle instrument panel 196.

The vehicle propulsion system 100 may also include a vehicle stability control sensor, such as inertial sensor(s) 199. Inertial sensors 199 may comprise one or more of the following: longitudinal, latitudinal, vertical, yaw, and pitch sensors.

Vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In other words, vehicle instrument panel may include a human machine interface (HMI) which a user may interact with. As one example, the vehicle instrument panel 196 may include a refueling button 197 which may be manually actuated or pressed by a vehicle operator to initiate refueling. For example, in response to the vehicle operator actuating refueling button 197, the fuel system in the vehicle may be depressurized so that refueling may be performed. In examples where the vehicle comprises an autonomous vehicle, refueling may be initiated under the control of control system 190, where refueling may be initiated without manual actuation of refueling button 197.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. Specifically, control system 190 may be coupled to a wireless communication device (not shown at FIG. 1 but see 284 at FIG. 2) for direct communication of the vehicle system 100 with wireless network 131. Using wireless communication, the vehicle system 100 may in some examples retrieve data from servers, infrastructures, other vehicles, etc., regarding current and/or upcoming ambient conditions (such as ambient humidity, temperature, pressure, precipitation, wind, etc.), current traffic conditions, etc.

Vehicle system 100 may also include an onboard navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, traffic information, etc. In one example, information received from the GPS may be utilized in conjunction with route learning methodology, such that routes commonly traveled by a vehicle, or commonly traveled by a particular vehicle operator, or commonly traveled by a passenger (in the case of an autonomous vehicle) may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. The GPS may in some examples also provide suggested routes for a vehicle to take, depending on current vehicle operating conditions, current traffic conditions, etc.

Figure 2:
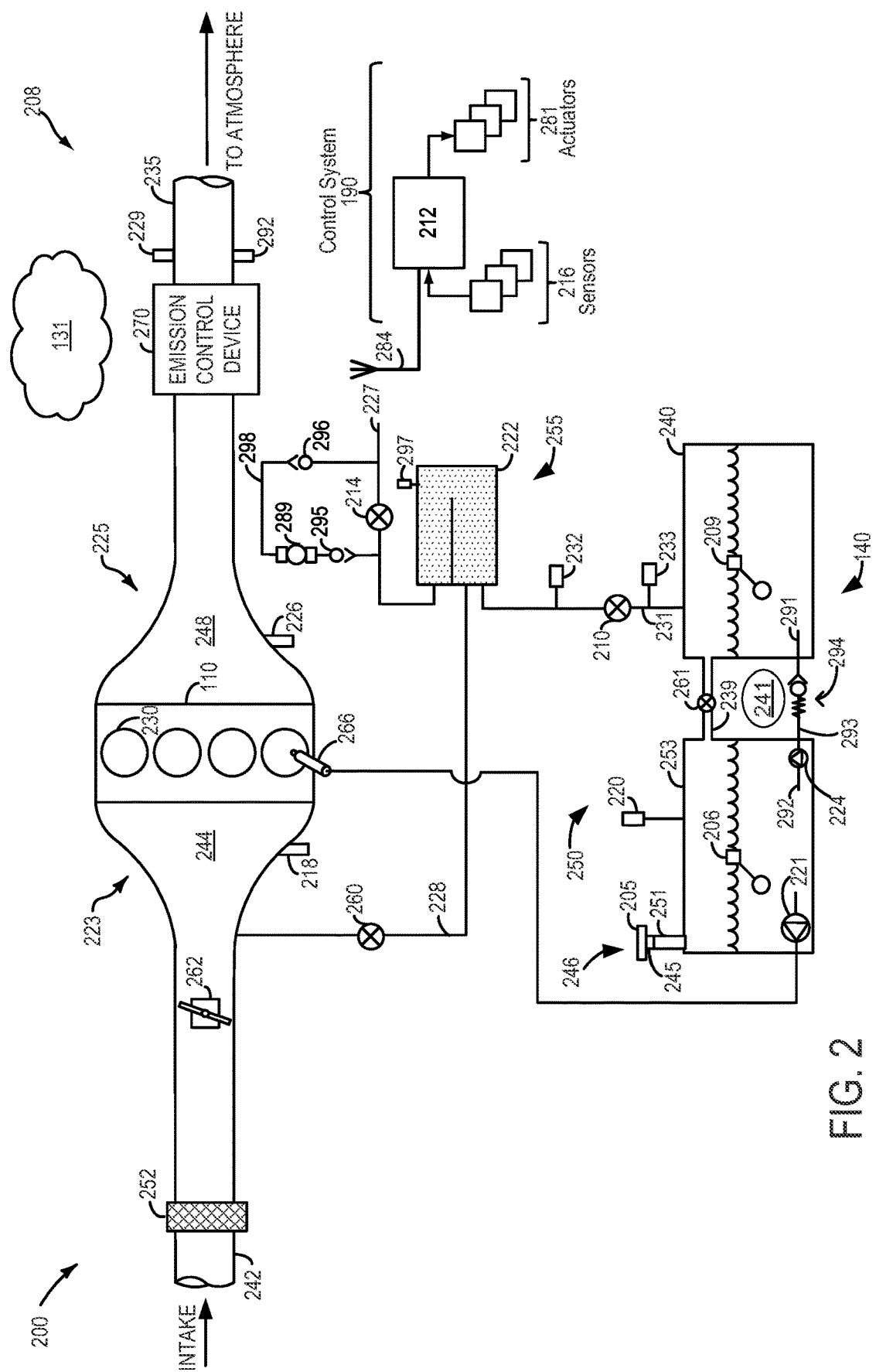
FIG. 2 schematically shows an example engine system with a fuel system that includes a saddle fuel tank and an evaporative emissions system.

FIG. 2 shows a schematic depiction of a vehicle system 200 that can derive propulsion power from engine system 208. Vehicle system 200 may be a conventional vehicle powered solely through combustion, or it may be a hybrid vehicle system that can derive propulsion power from engine system 208 and/or an on-board energy storage device (e.g. 150), such as a battery system. An energy conversion device, such as a generator (e.g. 160), may be operated to absorb energy from vehicle motion and/or engine operation, and then convert the absorbed energy to an energy form suitable for storage by the energy storage device.

Engine system 208 may include engine 110 having a plurality of cylinders 230. Engine 110 includes an engine intake 223 and an engine exhaust 225. Engine intake 223 includes an air intake throttle 262 fluidly coupled to the engine intake manifold 244 via an intake passage 242. Air may enter intake passage 242 via air filter 252. Engine exhaust 225 includes an exhaust manifold 248 leading to an exhaust passage 235 that routes exhaust gas to the atmosphere. Engine exhaust 225 may include one or more emission control devices 270 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated on herein. In some embodiments, wherein engine system 208 is a boosted engine system, the engine system may further include a boosting device, such as a turbocharger (not shown).

Engine system 208 is coupled to fuel system 140 and evaporative emissions system 255. Fuel system 140 includes a fuel tank 250 coupled to a fuel pump 221 and evaporative emissions system 255 includes a fuel vapor canister 222. During a fuel tank refueling event, fuel may be pumped into the vehicle from an external source through refueling port 251 that is part of a refueling system 246. Fuel tank 250 may hold a plurality of fuel blends, including fuel with a range of alcohol amounts, such as various gasoline-ethanol blends, including E10, E85, gasoline, etc., and combinations thereof.

Further, refueling system 246 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, a fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be clutch, which, when engaged, prevents the removal of the fuel cap. The clutch may be electrically locked, for example, by a solenoid, or may be mechanically locked, for example, by a pressure diaphragm.

In some embodiments, refueling lock 245 may be a filler pipe valve. In such embodiments, refueling lock 245 may not prevent the removal of the fuel cap 205. Rather, refueling lock 245 may prevent the insertion of a refueling pump into refueling port 251. In such an example, the refueling lock may be electrically locked, for example by a solenoid, or mechanically locked, for example by a pressure diaphragm.

In some embodiments, refueling lock 245 may be a refueling door lock, such as a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Fuel tank 250 may be configured as a bifurcated fuel tank, or a fuel tank with two or more separate chambers, wherein each chamber is fluidically coupled to at least one other chamber via a conduit. In this example, secondary fuel tank 240 is shown coupled to primary fuel tank 253. Discussed herein, secondary fuel tank 240 may be referred to as passive fuel tank 240, and primary fuel tank 253 may be referred to as active fuel tank 253. Discussed herein, primary fuel tank 253 may also be referred to as "active side" 253, and secondary fuel tank 240 may be referred to as "passive side" 240. Primary fuel tank 253 and secondary fuel tank 240 may be considered a single, saddle fuel tank, which may be configured to be placed over the engine driveline 241. Secondary fuel tank 240 may hold additional fuel that is metered to primary fuel tank 253 via a jet pump 224. Jet pump 224 may transfer fuel from secondary fuel tank 240 to primary fuel tank 253, based on a signal received from controller 212, for example. In some examples, jet pump 224 may be configured to constantly replenish fuel withdrawn from primary fuel tank 253 by fuel pump 221. Jet pump 224 may transfer fuel between secondary fuel tank 240 and primary fuel tank 253 via a conduit or hose 293 coupled to jet pump 224. Jet pump 224 may have an inlet 291 positioned in secondary fuel tank 240 and an outlet 292 positioned in primary fuel tank 253. A check valve 294 may be included in conduit 293 of jet pump 224, to enable fuel to be drawn from secondary fuel tank 240 into primary fuel tank 253 when jet pump 224 is activated, but which prevents fuel and/or fuel vapors from traveling from primary fuel tank 253 to secondary fuel tank 240, when jet pump 224 is off. Further, in some embodiments, jet pump 224 and fuel pump 221 may be combined into a single pump unit.

A first fuel level sensor 206 located in primary fuel tank 253 may provide an indication of the fuel level ("Fuel Level Input") to controller 212. As depicted, fuel level sensor 206 may comprise a float connected to a variable resistor. Alternatively, other types of fuel level sensors may be used.

A conduit 239 may couple primary fuel tank 253 to secondary fuel tank 240 to allow vapors and in some examples fuel to flow between primary fuel tank 253 and secondary fuel tank 240. In some examples, jet pump 224 may transfer fuel between primary fuel tank 253 and secondary fuel tank 240 via a hose or conduit passing through conduit 239. Conduit 239 may include a first refueling valve (RV1) 261. RV1 261 may comprise a valve actuatable open or closed under control of controller 212. Accordingly, RV1 may comprise a solenoid valve, a butterfly valve, a flapper valve, etc. During certain vehicle maneuvers or other conditions that may cause fuel sloshing, fuel from primary fuel tank 253 may flow into secondary tank 240, or vice-versa via conduit 239, provided RV1 is open. Fuel may in some examples also flow between primary fuel tank 253 and secondary tank 240 (or vice-versa) via conduit 239 when the vehicle is traversing a steep gradient, under conditions where RV1 is commanded open. In some examples, during refueling, upon primary fuel tank 253 reaching full capacity and with RV1 open, fuel may flow from primary fuel tank 253 into secondary fuel tank 240 via conduit 239. In some examples, jet pump 224 may mediate fuel transfer between primary fuel tank 253 and secondary fuel tank 240 during refueling events. A second fuel level sensor 209 located in secondary fuel tank 240 may provide an indication of the fuel level ("Fuel Level Input") in secondary fuel tank 240 to controller 212. As depicted, fuel level sensor 209 may comprise a float connected to a variable resistor. Alternatively, other types of fuel level sensors may be used. Further, vehicle system 200 may include an overall fuel level indicator (not shown) that indicates an average of an output of first fuel level indicator 206 and second fuel level indicator 209.

Fuel pump 221 is configured to pressurize fuel delivered to the injectors of engine 110, such as example injector 266. While only a single injector 266 is shown, additional injectors are provided for each cylinder. It will be appreciated that fuel system 140 may be a return-less fuel system, a return fuel system, or various other types of fuel system. Vapors generated in fuel tank 253 and/or 240 may be routed to fuel vapor canister 222, via load conduit 231, before being purged to the engine intake 223. From the illustration depicted at FIG. 2, it may be understood that load conduit 231 extends from secondary fuel tank 240, and not from primary fuel tank 253.

Fuel vapor canister 222 may be filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 222 may be purged to engine intake 223 via purge line 228 by opening canister purge valve 260. While a single canister 222 is shown, it will be appreciated that fuel system 140 may include any number of canisters. One or more temperature sensors 297 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Canister 222 includes a vent 227 for routing gases out of the canister 222 to the atmosphere when storing, or trapping, fuel vapors from fuel tank 250. Vent 227 may also allow fresh air to be drawn into fuel vapor canister 222 when purging stored fuel vapors to engine intake 223 via purge line 228 and purge valve 260. While this example shows vent 227 communicating with fresh, unheated air, various modifications may also be used. Vent 227 may include a canister vent valve 214 to adjust a flow of air and vapors between canister 222 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 200 is a hybrid vehicle, it may have reduced engine operation times due to the vehicle being powered by engine system 208 during some conditions, and by the energy storage device (e.g. 150) under other conditions. While the reduced engine operation times reduce overall carbon emissions from the vehicle, they may also lead to insufficient purging of fuel vapors from the vehicle's emission control system. To address this, a fuel tank isolation valve 210 may be optionally included in load conduit 231 such that fuel tank 250 is coupled to canister 222 via the fuel tank isolation valve. Discussed herein, fuel tank isolation valve 210 may also be referred to as second refueling valve 210 (RV2). Under certain conditions, which will be elaborated upon further below, RV2 210 may be kept closed to limit the amount of diurnal or "running loss" vapors directed to canister 222 from fuel tank 250. During other conditions, isolation valve 210 may be commanded open. As an example, during refueling operations, and selected purging conditions, isolation valve 210 may be temporarily opened, e.g., for a duration, to direct fuel vapors from the fuel tank 250 to canister 222. By opening the valve during purging conditions when the fuel tank pressure is higher than a threshold (e.g., above a mechanical pressure limit of the fuel tank above which the fuel tank and other fuel system components may incur mechanical degradation), the fuel tank vapors may be released into the canister and the fuel tank pressure may be maintained below pressure limits. While the depicted example shows isolation valve 210 positioned along load conduit 231, in alternate embodiments, the isolation valve may be mounted on secondary fuel tank 240. As will be discussed in further detail below, RV2 210 may be controlled as a function of fuel level in secondary fuel tank 240, along with RV1 261. It may be understood that RV2 may comprise a catchable valve, for example RV2 may catch open and/or caught closed. Similarly, RV1 may comprise a catchable valve, for example RV1 may catch open and/or caught closed. In this way, the amount of battery power required to maintain RV1 and/or RV2 may be reduced.

Pressure sensor 220 may be coupled to fuel system 140 for providing an estimate of a fuel system pressure. In one example, the fuel system pressure is a fuel tank pressure, wherein pressure sensor 220 is a fuel tank pressure transducer (FTPT) coupled to fuel tank 253 for estimating a fuel tank pressure or vacuum level. In some examples, a second pressure sensor (not shown) may be coupled to secondary fuel tank 240 for estimating a fuel tank pressure or vacuum level.

Fuel vapors released from canister 222, for example during a purging operation, may be directed into engine intake manifold 244 via purge line 228. The flow of vapors along purge line 228 may be controlled by canister purge valve (CPV) 260, coupled between the fuel vapor canister and the engine intake. The quantity and rate of vapors released by CPV 260 may be determined by the duty cycle of an associated CPV solenoid (not shown). As such, the duty cycle of the CPV solenoid may be determined by the vehicle's powertrain control module (PCM), such as controller 212, responsive to engine operating conditions, including, for example, engine speed-load conditions, an air-fuel ratio, a canister load, etc. By commanding CPV 260 to be closed, the controller may seal the fuel vapor recovery system from the engine intake. An optional canister check valve (not shown) may be included in purge line 228 to prevent intake manifold pressure from flowing gases in the opposite direction of the purge flow. As such, the check valve may be necessary if the canister purge valve control is not accurately timed or the CPV itself can be forced open by a high intake manifold pressure. An estimate of the manifold absolute pressure (MAP) or manifold vacuum (ManVac) may be obtained from MAP sensor 218 coupled to intake manifold 244 and communicated with controller 212. Alternatively, MAP may be inferred from alternate engine operating conditions, such as mass air flow (MAF), as measured by a MAF sensor (not shown) coupled to the intake manifold.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open RV1 261 and RV2 210 while closing CPV 260 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open RV1 261 and RV2 210, while maintaining CPV 260 closed, to depressurize the fuel tank before allowing fuel to be added therein. As such, RV1 261 and RV2 210 may be kept open during the refueling operation to allow refueling vapors to be stored in the canister. After refueling is completed, RV2 210 may be closed.

Returning to the discussion on operating modes of the fuel system, as yet another example, the fuel system may be operated in a canister purging mode (e.g., after an emission control device light-off temperature has been attained and with the engine running), wherein the controller 212 may open CPV 260 while closing RV2 210. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine.

Controller 212 may also be configured to intermittently perform diagnostic routines for presence or absence of evaporative emissions on fuel system 140 to confirm that the fuel system is not degraded. As such, such diagnostic routines may be performed while the vehicle is running with the engine on (e.g., during an engine mode of hybrid vehicle operation) or with the engine off (e.g., during a battery mode of hybrid vehicle operation). Specifically, in situations where the engine is running, engine intake manifold vacuum may be used to apply a vacuum on a fuel system (by commanding open the CPV) and/or evaporative emissions system that is sealed from atmosphere (by closing the CVV), and once the desired vacuum is attained, the fuel system and/or evaporative emissions system may be sealed from engine intake (by commanding closed the CPV) and pressure bleedup may be monitored. Pressure bleedup that remains below a preset pressure threshold and/or pressure bleedup that bleeds up at a rate lower than a threshold bleedup rate, may be indicative of an absence of a source of evaporative emissions stemming from the fuel system.

However, because engine run time may be limited, particularly for hybrid vehicles, a vacuum pump 289 configured to apply a negative pressure with respect to atmospheric pressure on the fuel system and/or evaporative emissions system may be included. Specifically, vacuum pump 289 may be configured in a vacuum pump conduit 298. The vacuum pump may comprise a rotary vane pump, a diaphragm pump, a liquid ring pump, a piston pump, a scroll pump, a screw pump, a wankel pump, etc., and may be understood to be in parallel with the CVV 214. The vacuum pump conduit 298 may be configured to route fluid flow (e.g. air and fuel vapors) from vent line 227, around canister vent valve 214. Vacuum pump conduit 298 may include a first check valve (CV1) 295, and second check valve (CV2) 296. When the vacuum pump 289 is activated in a vacuum-mode, air may be drawn from vent line 227 between canister 222 and CVV 214, through vacuum pump conduit 298, back to vent line 227 at a position between canister vent valve 214 and atmosphere. In other words, the vacuum pump may be activated to evacuate the evaporative emissions system 255, and may further evacuate fuel system 140, as a function of a status of RV2 210 and RV1 261, as will be discussed in further detail below. CV1 295 may comprise a pressure/vacuum-actuated valve that may open responsive to activating the vacuum pump to evacuate the fuel system and/or evaporative emissions system, and which may close responsive to the vacuum pump 289 being deactivated, or turned off. Similarly, CV2 296 may comprise a pressure/vacuum-actuated valve. When the vacuum pump 289 is activated to evacuate the fuel system and/or evaporative emissions system, CV2 296 may open to allow fluid flow to be routed from vacuum pump conduit 298 to atmosphere, and which may close responsive to the vacuum pump 289 being turned off. It may be understood that CVV 214 may be commanded closed in order to evacuate the fuel system and/or evaporative emissions system via the vacuum pump 289.

In the vehicle system 200 where the vacuum pump 289 is included, calibrations may be utilized in order to determine vacuum thresholds for indicating a presence or absence of evaporative emissions. For example, there may be a 3D lookup table stored at the controller, which may enable determination of thresholds as a function of ambient temperature and/or fuel level.

In the example vehicle system 200, a pressure sensor 232 may be included, positioned in load conduit 231. Thus, it may be understood that when RV2 210 is closed, vacuum pump 289 or the engine may be used to evacuate the evaporative emissions system and may rely on pressure sensor 232 for monitoring pressure bleedup to indicate a presence or absence of evaporative emissions stemming from the evaporative emissions system.

In another example, RV2 210 may be commanded or maintained open while RV1 261 may be commanded or maintained closed. In this way, vacuum pump 289 or the engine may be used to evacuate secondary fuel tank 240 to a desired vacuum, at which point RV2 210 may be commanded closed and pressure bleedup monitored in secondary fuel tank 240 via pressure sensor 233. In this way, secondary fuel tank 240 may be analyzed for presence or absence of evaporative emissions independently from primary fuel tank 253 and evaporative emissions system 255.

In still another example, RV2 210 may be commanded open along with RV1 261, and vacuum pump 289 or the engine may be used to evacuate primary fuel tank 253 (along with secondary fuel tank 240) to the desired vacuum. Then, if RV1 261 is closed, pressure bleedup in the primary fuel tank 253 may be monitored via pressure sensor 220, to indicate the presence or absence of evaporative emissions. In this way, primary fuel tank 253 may be analyzed for presence or absence of evaporative emissions independently from secondary fuel tank 240 and evaporative emissions system 255.

In another example, each of the primary fuel tank 253, secondary fuel tank 240, and evaporative emissions system 255 may each be monitored simultaneously for presence or absence of a source of evaporative emissions. Specifically, with RV2 210 and RV1 261 open and with CVV 214 closed, vacuum pump 289 may be used to evacuate the evaporative emissions system, and both the primary and secondary fuel tanks, to a desired vacuum. Upon reaching the desired vacuum, RV1 and RV2 may be commanded closed, and vacuum pump 289 may be deactivated. Pressure bleedup may then be independently monitored for each of primary fuel tank 253 (via pressure sensor 220), secondary fuel tank 240 (via pressure sensor 233), and evaporative emissions system (via pressure sensor 232). While the above example relies on the vacuum pump for evacuating the fuel system and evaporative emissions system, it may be understood that the engine may be used for the evacuating in other examples, by commanding open the CPV to apply engine intake vacuum on the fuel system and/or evaporative emissions system, and in response to the desired vacuum being reached, commanding closed the CPV to seal the evaporative emissions system and fuel system from engine intake.

The controller 212 may be coupled to a wireless communication device 284 for direct communication of the control system 190 and vehicle system 200 with wireless network 131, as mentioned above.

Vehicle system 200 may further include control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 226 located upstream of the emission control device, temperature sensor 297, MAP sensor 218, pressure sensor 229, first fuel level sensor 206, second fuel level sensor 209, and fuel tank pressure sensor 220. Other sensors such as additional pressure, temperature, air/fuel ratio, and composition sensors may be coupled to various locations in the vehicle system 200. As another example, the actuators may include fuel injector 266, RV1 261, RV2 210, purge valve 260, vent valve 214, fuel pump 221, jet pump 224, vacuum pump 289, and throttle 262. The control system 190 may include a controller 212. The controller may receive input data from the various sensors, process the input data, and trigger the actuators in response to the processed input data based on instruction or code programmed therein corresponding to one or more routines. For example, controller 212 receives signals from the various sensors of FIG. 2 and employs the various actuators of FIG. 2 to adjust engine operation based on the received signals and instructions stored on a memory of the controller.

Thus, discussed herein, secondary fuel tank 240 includes load conduit 231 stemming therefrom, where secondary fuel tank 240 is selectively coupled to fuel vapor storage canister 222 via RV2 210, and selectively coupled to primary fuel tank 253 via RV1 261. As will be elaborated in further detail below, such a configuration may enable faster depressurization routines of a saddle fuel tank (e.g. 250), in response to a request for refueling, as opposed to other configurations where the primary fuel tank (e.g. 253) is selectively coupled to a canister (e.g. 222) via a load conduit (e.g. 231) stemming from the primary fuel tank (e.g. 253).

Figure 3:
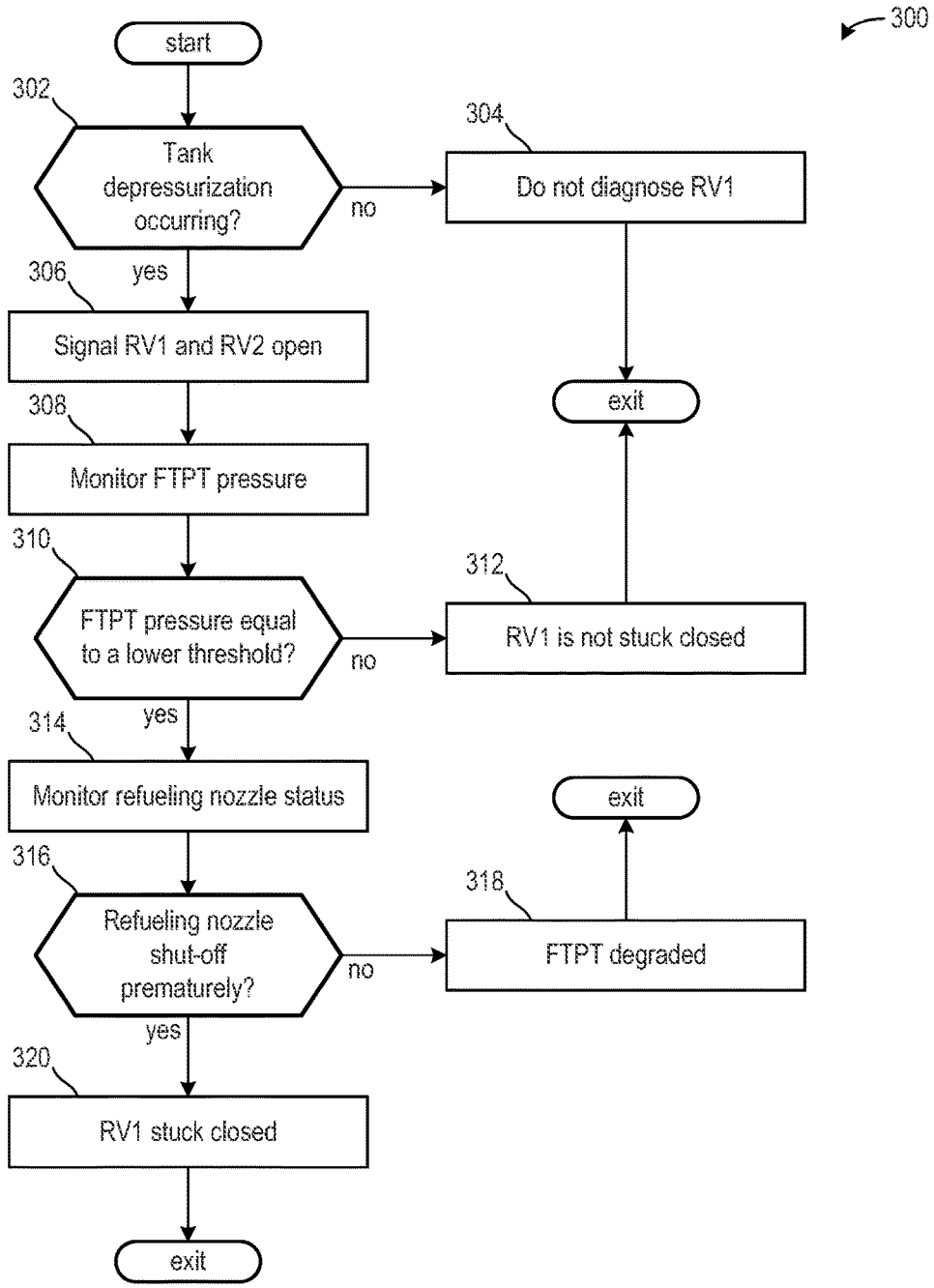
FIG. 3 shows a method for diagnosing a first condition of a first refueling valve of the fuel system.

Turning now to FIG. 3, it shows a method 300 for diagnosing a condition of RV1 of a fuel tank system. In one example, the condition is a first condition where the RV1 is stuck closed. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method 300 begins at 302, which includes determining if a tank depressurization is occurring. The tank depressurization may include where a passive fuel tank (e.g., the secondary tank 240 of FIG. 2) is utilized as an expansion chamber to depressurize an active tank (e.g., the primary tank 253 of FIG. 2). During the tank depressurization, which may be initiated in response to a refueling request, fuel in the primary tank may be transferred to the secondary tank. For example, a jet pump, such as pump 224 of FIG. 2, may be activated to flow fuel from the primary tank to the secondary tank. In one example, RV1 and RV2 may be open during the transferring period. Additionally or alternatively, RV1 may be open and RV2 may be closed. Once the depressurization has occurred, RV2 may be commanded open and RV1 may be commanded closed to seal the fuel tanks from one another. A refueling request may be present in response to a user of the vehicle pressing a button to indicate the desire to refuel the saddle fuel tank.

If the tank depressurization is not occurring, then the method 300 may proceed to 304, which includes not initiating the diagnostic for RV1.

If the tank depressurization is occurring, such as due to a refueling request being present, then at 306, the method 300 may include signaling RV1 and RV2 open.

At 308, the method 300 may include monitoring an FTPT pressure.

At 310, the method 300 may include determining if the FTPT pressure is equal to a lower threshold. In one example, the lower threshold is equal to 0. In another example, the lower threshold is based on a pressure less than an average pressure in the load conduit when RV1 and RV2 are open. If the FTPT pressure is not equal to the lower threshold, then at 312, the method 300 includes determining RV1 is not stuck closed. As such, vapors may flow from the primary tank, to the secondary tank, and to the FTPT. The diagnostic is passed and RV1 is not degraded.

If the FTPT is equal to the lower threshold, then RV1 may be stuck closed or the FTPT may be irrational (e.g., degraded). The method 300 may diagnose the RV1 and the FTPT by monitoring a refueling nozzle condition during a refueling event at 314. At 316, the method 300 may include determining if the refueling nozzle has shut-off prematurely. In one example, if RV1 is stuck closed, then the refueling nozzle may shut-off prematurely at an upper threshold fuel level. In one example, the upper threshold level may be based on a 100% fuel limit of the primary fuel tank. Vapors in the primary fuel tank may not vent to the secondary fuel tank, and feedback to a FLVV may shut-off the refueling nozzle prior to filling the secondary fuel tank. Additionally or alternatively, if the primary fuel tank is equal in volume to the secondary fuel tank, the upper threshold level may be equal to half of a total fuel volume limit of the primary and secondary fuel tanks. If the refueling nozzle does not shut-off at the upper threshold level, then the RV1 is not stuck closed and at 318, the method 300 may determine that the FTPT is degraded. That is to say, the RV1 is open and vapors from the primary fuel tank may flow to the secondary fuel tank, thereby allowing refueling to proceed without a premature shut-off.

In one example, if the vehicle operator selects a fuel fill volume less than the upper threshold volume, then the diagnostic may not be completed. In some examples, the method 300 may include monitoring if the refueling nozzle is re-initiated following the shut-off and more fuel is dispensed. If the refueling nozzle is re-initiated following the shut-off, then RV2 may be stuck closed. If the refueling nozzle is not re-initiated, then a desired amount of fuel is dispensed and the diagnostic may be executed during a different refueling event. A diagnostic for determining if RV2 is stuck closed is described in FIG. 5.

If the refueling nozzle shuts-off at the upper threshold level, then vapors from the primary fuel tank may not migrate to the secondary fuel tank. At 320, the method 300 determines that the RV1 is stuck. An indicator lamp may be activated to indicate to a user that RV1 is stuck closed. In some examples, additionally or alternatively, a fuel fill limit of the primary fuel tank and/or both fuel tanks may be adjusted to account for the venting limitations of the primary fuel tank. For example, in order to alleviate vapor pressure build-up in the primary fuel tank, fuel may be displaced from the primary fuel tank to the secondary fuel tank. To mitigate the vapor pressure exceeding a threshold pressure, a fuel level in the primary fuel tank may be maintained below a determined fuel level. The determined fuel level may be less than the upper threshold level. In one example, the determined fuel level may be based on a fuel level where engine fueling may be supported and a head volume of the tank for receiving vapors maintains the vapor pressure below the threshold pressure. Additionally or alternatively, the determined fuel level may be adjusted based on ambient conditions such as temperature, sunlight, and the like, which may alter vapor generation in the primary fuel tank. In some examples, additionally or alternatively, engine fueling may be adjusted when RV1 is stuck closed. For example, engine fueling may increase such that an air/fuel ratio of the engine is lower (e.g., richer). The determined fuel level may be further based on driver behavior, a length of time of all-electric operation, and an estimated duration of engine run-time.

In one example, when the vehicle is off and RV1 is stuck closed, fuel from the primary tank may be pumped to the secondary tank. By doing this, vapors from the primary tank may flow to the secondary tank via the pump, which may then be directed to the canister. Prior to a subsequent vehicle start, the pump may return a portion of fuel in the secondary tank to the primary tank for engine fueling.

Figure 4:
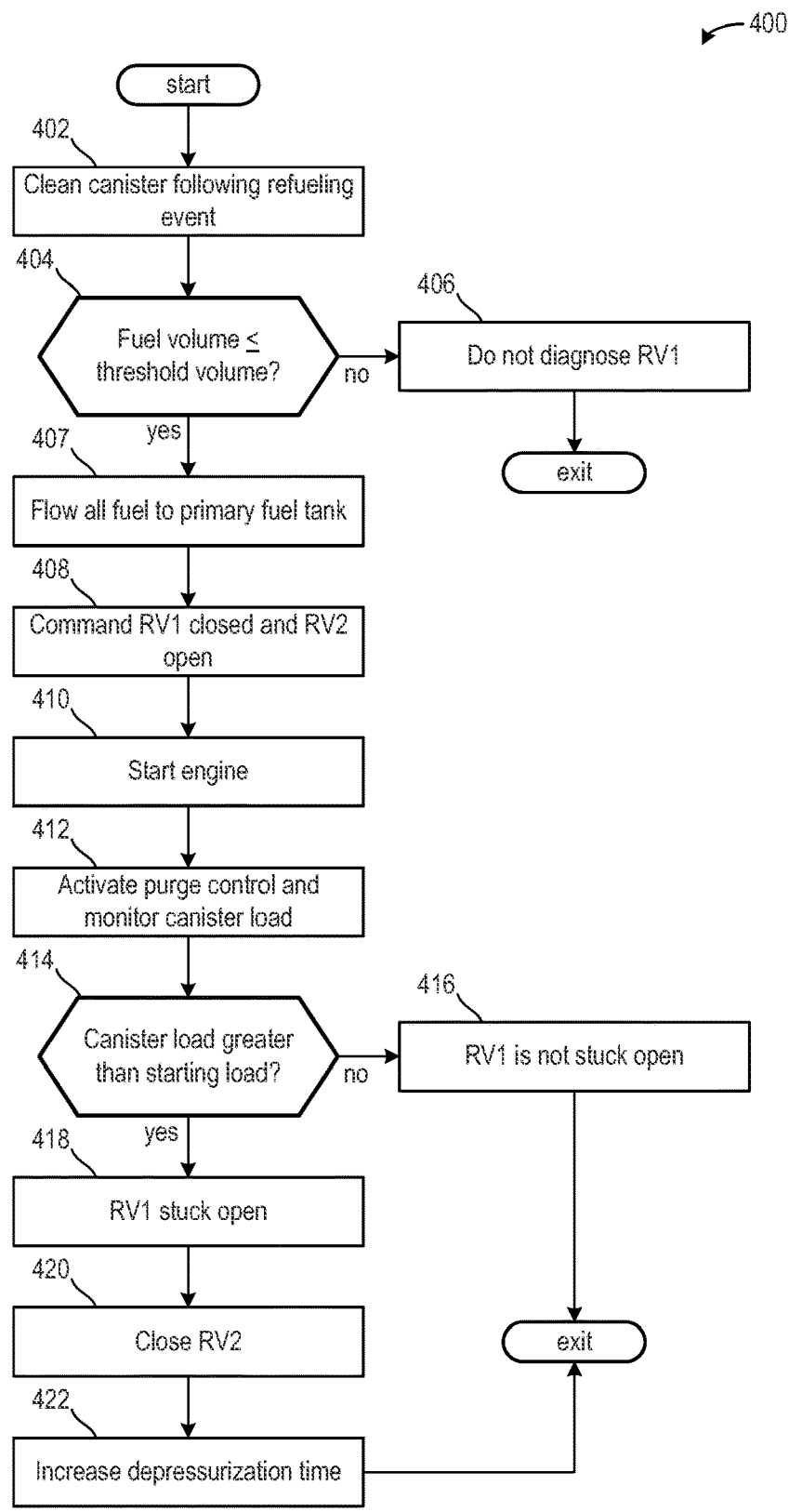
FIG. 4 shows a method for diagnosing a second condition of the first refueling valve of the fuel system.

Turning now to FIG. 4, it shows a method 400 for diagnosing a second condition of RV1. In one example, the second condition is a stuck open condition. In one example, the method 400 may be executed following a passed diagnostic of the method 300 of FIG. 3. As such, it may be determined that RV1 is not stuck closed prior to executed method 400. Additionally or alternatively, the method 400 may be executed at a time independent of a result of method 300.

The method 400 begins at 402, which includes cleaning a canister following a refueling event. Cleaning the canister may include opening a purge valve and flowing vapors from the canister to an engine. The engine may be fueled and the vehicle is on during the canister cleaning. As such, the refueling event is complete when the canister cleaning is executed and a canister load is reduced.

Additionally or alternatively, the canister load may be determined. The canister load may be determined via a hydrocarbon sensor arranged at a canister inlet port in combination with a purge event duration, ambient weather, oxygen sensor, and a canister temperature. In one example, the canister load may be determined when RV1 is open and RV2 is closed. As such, the canister load may be determined when the canister is sealed from the fuel tanks. As such, the canister may not be cleaned or fully cleaned in order to execute the diagnostic of method 400. In some examples, the canister may be at least partially cleaned so that the canister load is less than a full load of the canister.

At 404, the method 400 may include determining if a fuel volume of the secondary fuel tank is less than or equal to a threshold volume. The threshold volume may be a dynamic value based on a current fuel volume of the primary fuel tank, wherein as the current fuel volume in the primary fuel tank decreases, the threshold volume increases. If the fuel volume of the secondary fuel tank is greater than the threshold volume, then the secondary fuel tank may not be emptied by directing fuel therein to the primary fuel tank, and at 406, the method 400 may include not diagnosing RV1. Additionally or alternatively, the method may continue to monitor the fuel level and once the fuel level is less than or equal to the threshold volume, the diagnostic for determining if RV1 is stuck open may be executed.

If the fuel volume is less than or equal to the threshold volume, then at 407, the method 400 may include moving all fuel in the secondary fuel tank to the primary fuel tank. In one example, the pump may be activated to draw fuel from the secondary fuel tank to the primary fuel tank. As such, the secondary fuel tank may be evacuated of liquid fuel and vapors.

At 408, the method 400 may include commanding RV1 closed and RV2 open. As such, the primary fuel tank may be sealed from the secondary fuel tank and the secondary fuel tank may be open to the canister.

At 410, the method 400 may include activating the engine. Activating the engine may include fueling the engine and executing combustion in cylinders of the engine.

At 412, the method 400 may include activating purge control and monitoring the canister load. Activating purge control may include opening a purge valve to fluidly couple the canister to the intake of the engine. Monitoring the canister load may include sensing a vapor flow from the canister to the engine. Additionally or alternatively, feedback from the FTPT may be monitored.

At 414, the method 400 may include determining if the canister load is greater than a starting load. The starting load may be equal to a clean canister load or to a load less than a full load due to a partial cleaning. For example, if canister vapors are flowing to the engine, then vapors from the primary fuel tank may still be flowing to the second fuel tank due to a stuck open RV1. If the canister load is not greater than the starting load, then the canister may still be clean and vapors may not be flowing from the secondary tank to the canister and at 416, the method 400 may include determining the RV1 is not stuck open. As such, vapors from the primary fuel tank may be blocked from flowing to the secondary fuel tank and the secondary fuel tank may remain free of fuel vapors and liquid fuel while the RV2 is open.

If the canister load is greater than the starting load and vapors are flowing to the canister during the purge control, then at 418, the method 400 may include determining RV1 is stuck open. Vapors from the primary tank may flow through the open RV1, into the secondary tank, through the open RV2, into the canister, and to the engine. This may increase a load of the canister for a duration, thereby indicating the first tank is not sealed via RV1.

At 420, the method 400 may include closing RV2. RV2 may be closed to block vapor flow from the primary and secondary tanks to the canister. RV2 may be selectively opened during certain conditions when the canister is conditioned to receive more vapors, such as following a cleaning.

At 422, the method 400 may include increasing a depressurization time. By doing this, emissions due to vapors may be mitigated. Increasing the depressurization time may include sending an alert to a vehicle operator that the fuel door may be locked for a greater duration of time. By doing this, customer satisfaction may be increased and a motivation to repair the RV1 may be increased.

Figure 5:
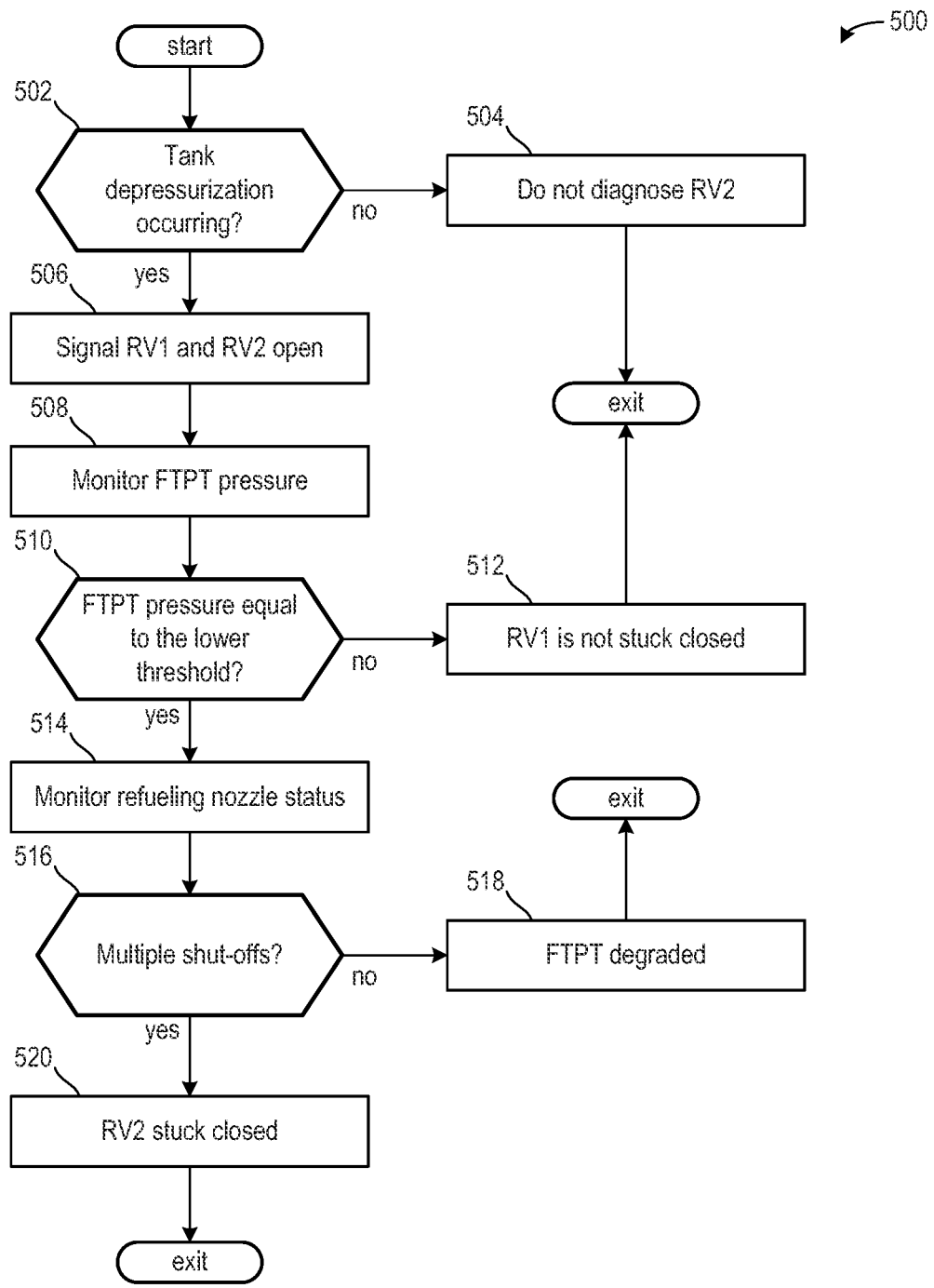
FIG. 5 shows a method for diagnosing a first condition of a second refueling valve of the fuel system.

Turning now to FIG. 5, it shows a method 500 for diagnosing a first condition of RV2. In one example, the first condition is a stuck closed condition. The method 500 begins at 502, which includes if a tank depressurization is occurring.

If the tank depressurization is not occurring, then the method 500 may proceed to 504, which includes where the diagnostic for RV2 is not initiated.

If the tank depressurization is occurring, such as due to a refueling request being present, then at 506, the method 500 may include signaling RV1 and RV2 open. The diagnostic may be initiated.

At 508, the method 500 may include monitoring an FTPT pressure.

At 510, the method 500 may include determining if the FTPT pressure is equal to the lower threshold. If the FTPT pressure is not equal to the lower threshold, then at 512, the method 500 may include determining RV2 is not stuck closed. As such, vapors may flow from the secondary tank to the FTPT. The diagnostic is passed and RV2 is not degraded.

If the FTPT is equal to the lower threshold, then RV2 may be stuck closed or the FTPT may be irrational (e.g., degraded). The method 500 may diagnose the RV2 and the FTPT by monitoring a refueling nozzle status at 514. At 516, the method 500 may include determining if the refueling nozzle has shut-off multiple times during refueling. In one example, the secondary fuel tank may be unable to vent vapors therefrom. This may lead to multiple refueling nozzle shut-offs during a single refueling event.

If multiple shut-offs (e.g., a plurality of shut-offs) do not occur, then at 518, the method 500 may include determining the FTPT is degraded and incorrectly sensing vapor pressures. The RV2 is not degraded. The RV2 is not stuck closed and the diagnostic with respect to the RV2 is passed.

If multiple shut-offs do occur, then at 520, the method 500 may include determining the RV2 is stuck closed. The diagnostic is negative. In one example, additionally or alternatively, operating parameters may be adjusted. For example, the fuel limit of the secondary fuel tank may be reduced. Additionally or alternatively, a duration of operation in an electric only mode of the vehicle may be reduced to limit vapor production in the secondary fuel tank.

In some examples, the methods 300 and 500 may be combined such that RV1 and RV2 being stuck closed may be diagnosed. For example, if a plurality of fuel shut-offs occurs and each of the shut-offs is at a fuel level different than the upper threshold level, then RV2 may be stuck closed. Additionally or alternatively, if only one fuel shut-off occurs, then RV1 may be stuck closed. In one example, both RV1 and RV2 may be stuck closed if during the diagnostic, a first premature shut-off occurs at the upper threshold level, followed by a plurality of fuel shut-offs at different fuel levels.

Figure 6:
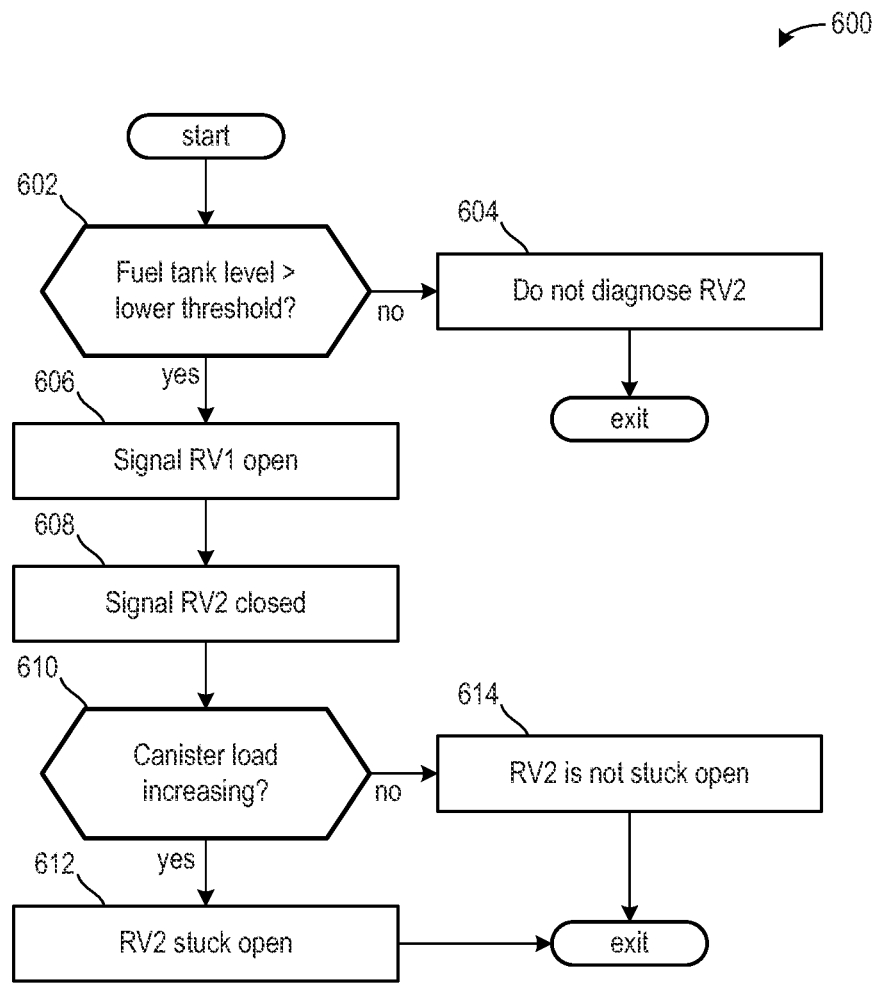
FIG. 6 shows a method for diagnosing a second condition of the second refueling valve of the fuel system.
Figure 7:
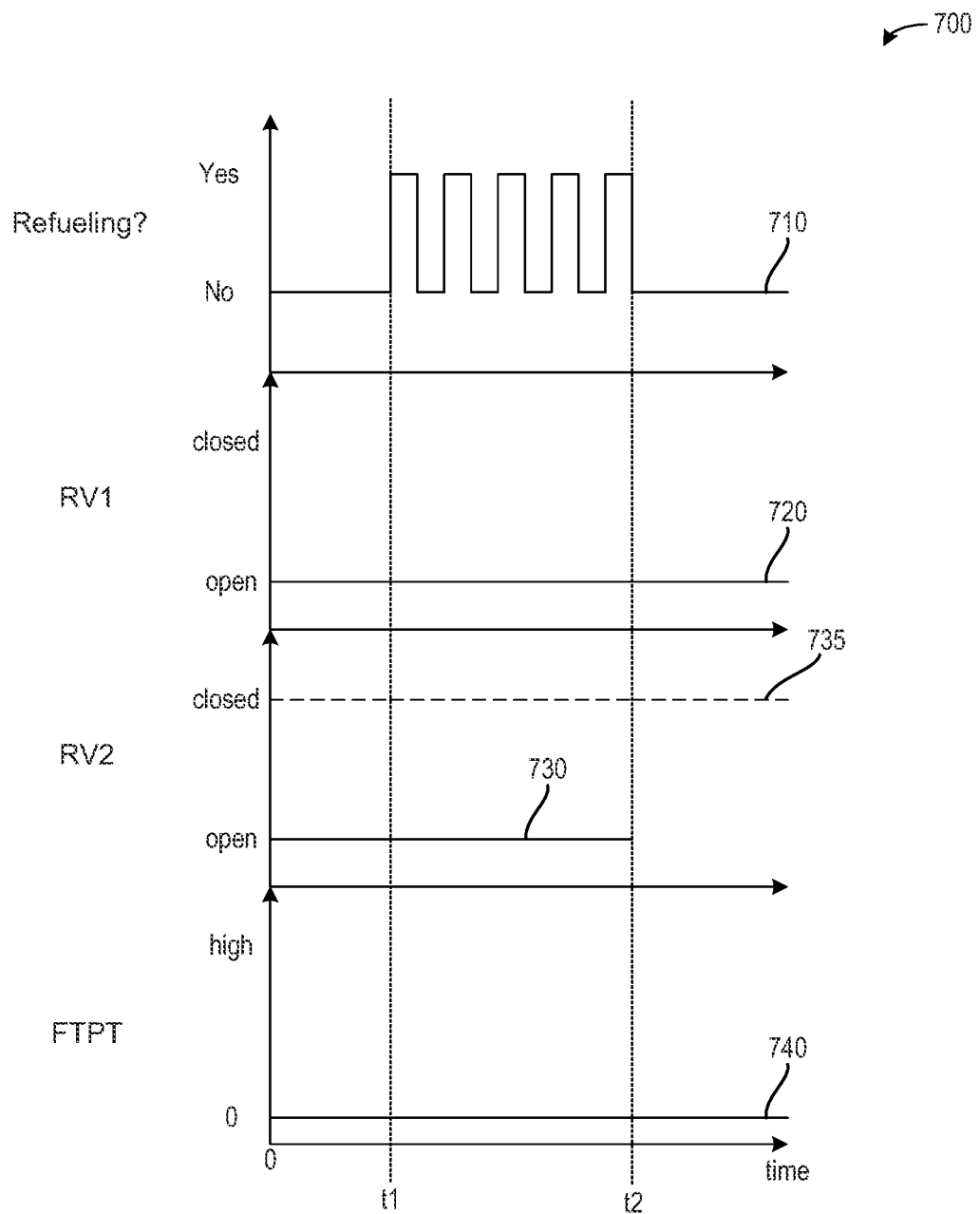
FIG. 7 shows a graphical illustration of the method of FIG. 5.

Turning now to FIG. 6, it shows a method 600 for diagnosing a second condition of the RV2. In one example, the method 600 may determine if the RV2 is stuck open. The method 600 begins at 602, which includes determining if a secondary fuel tank level is greater than a lower threshold fuel level. The lower threshold may correspond to an empty fuel tank. If the secondary fuel tank is empty and does not comprise liquid fuel, then at 604, the method 600 may include not executing the diagnostic for RV2. In some examples, additionally or alternatively, if fuel in the primary fuel tank is available, then fuel from the primary fuel tank may be directed to the secondary fuel tank and the diagnostic may be initiated.

If the fuel tank level is greater than the lower threshold fuel level, then at 606, the method 600 may include signaling RV1 open. The primary fuel tank may direct vapors to the secondary fuel tank.

At 608, the method 600 may include signaling RV2 closed. The secondary fuel tank may be sealed from the canister. Vapors in the secondary fuel tank may not flow to the canister.

At 610, the method 600 may include determining if the canister load is increasing. If the canister load is increasing, then at 612, the method 600 may include determining RV2 is stuck open. The diagnostic is not passed (e.g., negative). In one example, operating parameters may be adjusted to account for the RV2 being degraded. For example, an all-electric operation of the vehicle may be limited in order to increase engine run times to execute additional canister cleanings. Additionally or alternatively, future refueling events may be limited in volume to decrease vapor generation. For example, a total limit of the fuel tanks may be reduced. The total limit of the fuel tanks may be returned to a starting value once the RV2 is determined to no longer be stuck open.

If the canister load is not increasing, then at 614, the method 600 may include determining the RV2 is not stuck open. Vapors from the secondary fuel tank may flow to the canister when desired. Operating conditions may not be adjusted.

Additionally or alternatively, the FTPT may be used to diagnose if RV2 is stuck open. If the FTPT senses a pressure greater than the lower threshold, then the RV2 is stuck open.

Turning now to FIG. 7, it shows a graph 700 graphically illustrating a diagnostic of a valve of the fuel system comprising saddle tanks. Plot 710 illustrates if refueling is occurring. Plot 720 illustrates a position of RV1. Plot 730 illustrates a commanded position of RV2 and dashed line 735 illustrates an actual position of RV2. Plot 740 illustrates an FTPT output. Time increases from a left to a right side of the figure.

Prior to t1, refueling is not occurring (plot 710). However, a refueling request may be present and as such, RV1 and RV2 are commanded open (plots 720 and 730, respectively). The FTPT does not sense vapors despite RV2 being commanded open (plot 740). A condition of the refueling nozzle following depressurization is monitored to determine if the FTPT or RV2 is degraded.

At t1, the depressurization is complete and refueling begins. Between t1 and t2, refueling starts and stops multiple times. Thereby indicating the shut-offs are pre-mature and not requested by the customer.

At t2, the refueling is complete. The diagnostic determines RV2 is stuck closed and modifies operating parameters to account for RV2 being stuck closed. In one example, fuel tank fill-ups may be limited in volume. Additionally or alternatively, the engine may be operated more rich to consume more fuel and increase a head space in the fuel tanks to hold a greater amount of vapor. Additionally or alternatively, a duration of all-electric operation may be reduced to prioritize consumption of fuel in the fuel tanks. After t2, RV1 remains open. The FTPT senses no pressure as the fuel tanks are still sealed from the FTPT via the stuck closed RV2.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
diagnosing a valve arranged in a conduit fluidly coupling a primary fuel tank and a secondary fuel tank during a refueling event or following the refueling event, wherein the valve is determined to be stuck closed during the refueling event if the refueling event comprises a shut-off at an upper threshold fuel level.

2. The method of claim 1, further comprising emptying contents of the secondary fuel tank to the primary fuel tank and closing a second valve arranged between the secondary fuel tank and a canister.

3. The method of claim 2, further comprising cleaning the canister and commanding the valve closed following the refueling event.

4. The method of claim 3, further comprising determining the valve is stuck open following the refueling event if a load of the canister increases following commanding the valve closed.

5. The method of claim 3, further comprising determining a diagnostic is passed if a load of the canister remains constant following commanding the valve closed.

6. A system, comprising:
an engine;
a fuel system coupled to the engine, the fuel system comprising a primary fuel tank, a secondary fuel tank, and a canister; wherein
the primary fuel tank is fluidly coupled to the secondary fuel tank via a conduit, and wherein the secondary fuel tank is fluidly coupled to the canister via a load conduit, the conduit comprising a first valve and the load conduit comprising a second valve; and
a controller with computer-readable instructions stored on memory that when executed cause the controller to:
diagnose a first condition of one or more of the first valve and the second valve during a refueling event;
diagnose a second condition of one or more of the first valve and the second valve based on a canister load; and
determine the second valve is stuck open in response to a fuel tank pressure transducer (FTPT) reading a pressure greater than a lower value.

7. The system of claim 6, wherein the first condition is a stuck closed condition, and wherein the instructions further cause the controller to determine the first valve is stuck closed in response to a pre-mature shut-off occurring during the refueling event.

8. The system of claim 7, wherein the instructions further cause the controller to determine the first valve is not stuck closed and the fuel tank pressure transducer (FTPT) is degraded in response to the pre-mature shut-off not occurring during the refueling event.

9. The system of claim 6, wherein the instructions further cause the controller to determine the second valve is stuck closed in response to multiple pre-mature shut-offs occurring during the refueling event.

10. The system of claim 9, wherein the instructions further cause the controller to determine the second valve is not stuck closed and the fuel tank pressure transducer (FTPT) is degraded in response to a pre-mature shut-off not occurring during the refueling event.

11. The system of claim 6, wherein the second condition is a stuck open condition, and wherein the instructions further cause the controller to determine the first valve is stuck open in response to the canister load increasing following evacuating a content of the secondary fuel tank into the primary fuel tank and commanding the first valve closed.

12. The system of claim 6, wherein the instructions further cause the controller to determine the second valve is stuck open in response to the canister load increasing following commanding the second valve closed and a fuel level in the secondary fuel tank being greater than a lower threshold.

13. The system of claim 6, wherein one or more of the primary fuel tank and the secondary fuel tank is a saddle tank.

14. A method for a fuel system comprising a first fuel tank and a second fuel tank, the method comprising:
diagnosing a stuck closed condition of one or more of a first valve and a second valve during a refueling event based on a number of pre-mature refueling shut-offs and feedback from a fuel tank pressure transducer (FTPT); and
diagnosing a stuck open condition of one or more of the first valve and the second valve based on a load of a canister;
wherein the first valve is arranged in a conduit fluidly coupling the first fuel tank to the second fuel tank, and wherein the second valve is arranged in a load conduit fluidly coupling the second fuel tank to the canister.

15. The method of claim 14, wherein diagnosing the stuck closed condition of the first valve comprises detecting a pre-mature shut-off during the refueling event and the FTPT sensing a value equal to a lower threshold.

16. The method of claim 14, wherein diagnosing the stuck closed condition of the second valve comprises detecting a plurality of pre-mature shut-offs during the refueling event and the FTPT sensing a value equal to a lower threshold.

17. The method of claim 14, wherein diagnosing the stuck open condition of the first valve comprises transferring a content of the second fuel tank to the first fuel tank, commanding the first valve closed, and monitoring the load of the canister.

18. The method of claim 14, wherein diagnosing the stuck open condition of the second valve comprises monitoring the load of the canister when a fuel level in the second fuel tank is greater than a lower threshold fuel level.

* * * * *